United States Patent [19] [11] 4,244,535
Moodie [45] Jan. 13, 1981

[54] SEPARABLE FILM SPOOL AND METHOD OF LOADING FILM CASSETTE THEREWITH

[75] Inventor: Donald E. Moodie, Marblehead, Mass.

[73] Assignee: Polaroid Corporation, Cambridge, Mass.

[21] Appl. No.: 45,272

[22] Filed: Jun. 4, 1979

[51] Int. Cl.³ .......................................... B65H 75/18
[52] U.S. Cl. .................................................. 242/71.8
[58] Field of Search ...................... 242/71.8, 74, 74.1, 242/74.2; 206/52

[56] References Cited

U.S. PATENT DOCUMENTS

| | | | |
|---|---|---|---|
| 2,746,692 | 5/1956 | Wijchman | 242/71.8 |
| 3,002,610 | 10/1961 | Granger | 242/71.8 X |
| 3,653,605 | 4/1972 | Payne | 242/71.8 X |

FOREIGN PATENT DOCUMENTS 1147841 10/1959 Fed. Rep. of Germany .......... 242/71.8

*Primary Examiner*—Edward J. McCarthy
*Attorney, Agent, or Firm*—Leslie J. Payne

[57] ABSTRACT

A two-piece spool is disclosed for winding of a flexible strip and includes a pair of interconnected members having flanges. One of the two members has a tongue extending from the flange thereof and the other has means for slidably receiving the tongue. The receiving means includes structure responsive to sliding engagement with the tongue for forcing the tongue into a flexed condition from an initial condition to retain the members in their interconnected arrangement. A method is also disclosed for allowing manual loading of unexposed film wound on a spool in a film cassette by using separable spool members including a separable cover.

11 Claims, 7 Drawing Figures

SEPARABLE FILM SPOOL AND METHOD OF LOADING FILM CASSETTE THEREWITH

BACKGROUND OF THE INVENTION

This invention relates generally to the field of photography and, more particularly, to an improved separable two-piece photographic film spool as well as an improved method of manually loading unexposed film into a film cassette.

Multipurpose film cassettes have been developed in which a strip of photographic film is operated to be exposed, processed and projected without having to leave the cassette. Film cassettes of this type are disclosed in several U.S. Patents assigned in common with the present invention.

In cassettes of the noted category, a supply of unexposed light sensitive film is utilized. For selectively exposing the film strip, the cassette is inserted into a camera particularly adapted to receive and operate the same. Processing or developing the exposed film is achieved by removing the cassette from the camera and placing it into a player or processing and viewing apparatus. Such apparatus activates a cassette contained processor for depositing a desired layer of processing fluid for developing the latent images on the film's exposed emulsion surface. Thus, the conventional series of successive, positive transparent images on the exposed film are developed. Following processing in this manner, the player is operated as a projector. Accordingly, the film is advanced incrementally, frame-by-frame, past a light source so that the scenes to which the film were exposed can be projected onto a screen.

The current state of the art with respect to this type of multipurpose film cassette is represented by the disclosure of U.S. Pat. No. 3,951,530, issued Apr. 20, 1976, to Frank M. Czumak, Paul B. Mason, and Joseph A. Stella; which is assigned commonly with the present invention. In the disclosure of this patent, there is described a pair of photographic film spools rotatably mounted in the cassette housing. One spool is for take-up purposes, while the other is for supply purposes. Each of the spools is, however, provided with a pair of opposed and spaced apart flanges affixed to opposite ends of a central hub. Opposite ends of the film strip are attached to corresponding ones of the spool hubs so as to allow for synchronous winding and unwinding of the film. Means are provided in the player for selectively rotating both spools for achieving the desired winding. The spools are of a one-piece molded plastic construction. While the spools function satisfactorily, there remains, however, potential for problems. One drawback is that since the space between the opposed flanges widens from the hub to their periphery, due to the required draft needed for molding purposes, there is a tendency for the outer most convolutions of the film strip to walk or wander. By walking or wandering, it is meant that adjacent convolutions can shift relative to each other. Shifting might cause the undried deposited processing fluid to contact dry areas on the film, thereby adversely affecting the viewing of the film's images. This problem is accentuated should the film include a section for magnetic sound recording because the sound reproduction would be adversely affected.

Although avoidance of the draft on the flanges of a molded one-piece spool is possible with separable snap-together spools, there remain problems. Exemplary of the state of the art, with respect to such separable spools, are those described in the following U.S. Pat. Nos.: 2,575,025, issued to Mihalyi; 3,035,786, issued to Pieplow, et al.; 3,250,482, issued to Whitnah; 3,275,256, issued to Campbell, et al.; 3,797,777, issued to Hosono, et al.; 3,869,099, issued to Inaga; and 4,015,790, issued to Gelardi, et al. For example, those two-piece spools relying upon a frictional interference fit between the complementary and cooperating components achieving the interlock, suffer from the shortcoming that tolerance variations of the interfitting components might create a loose fit allowing shifting of the spool pieces. Thus, the spool's flanges might widen relative to each other, thereby resulting in the noted undesirable walking of the film strip, as well as the mentioned drawbacks attendant with such walking.

Another problem arising from use of a molded one-piece spool occurs during manual loading of the spool with the unexposed film into the cassette. With the conventional manual loading procedure, use is made of a light-tight container for storing the unexposed film during transportation. During the loading, the spool is removed from the container and mounted on a suitable cassette spindle for subsequent threading of the film. Removal of the film spool is necessitated because the container is too large for insertion into the highly compact film cassette of the type noted. Since the film is removed, it follows that the entire loading and subsequent film threading operations be performed in darkness. Otherwise, unintended fogging of the inner convolutions of the film becomes a problem. Of course, the additional container as well as associated ambient darkness requirement increases substantially the time, labor and costs associated with loading.

It will be appreciated, therefore, that conventional film spools particularly of the type usable in the noted multipurpose film cassettes suffer from several potential shortcomings. Moreover, these potential problems are further compounded by the requirement that the cassette and its components including the photographic film spool must be capable of mass production and manufacturing techniques as well as be within tolerance levels incident to such techniques for the system to be acceptable in a competitive commercial market.

SUMMARY OF THE INVENTION

In accordance with the present invention, an improved separable film spool and an improved method of manually loading unexposed film in a film cassette are provided for overcoming the aforementioned problems.

As in prior art film spools of the separable type, there are provided a pair of interconnected members each having a flange portion. At least one member has a hub section defining the rotational axis of the assembled spool and configured for supporting the strip in a convolutely wrapped condition.

In an illustrated embodiment, a first of the pair of members is provided with a tongue extending from the flange of the first member. A second of the pair of members has means for slidably receiving the tongue so as to interconnect the members. To retain the members in their interconnected condition, the receiving means includes means for forcing the tongue into a flexed condition from an initial condition.

Also, according to the present invention there is provided an improved method of loading unexposed film into a film cassette. The cassette is of the type having a spindle for rotatably supporting a film spool member.

For effectuating this method, there is provided the steps of winding convolutions of the film strip upon the hub of a first member of a separable two-member spool; releasably attaching a film cover to the hub of the first spool member for substantially encapsulating the film so that the film does not become fogged due to light leakage; mounting the film cover and the first spool member on the spindle; removing the film cover from the first spool member while the first spool member is still mounted on the spindle; and joining the second spool member of the separable spool to the first spool member while the latter is still mounted on the spindle.

Among the objects of the invention are, therefore, the provision of an improved two-piece spool member for use with film; the provision of a film cassette having an improved two-piece spool; and the provision of an improved method of loading unexposed film into a film cassette.

Other objects and further scope of applicability of the present invention will become apparent from the detailed description to follow when taken in conjunction with the accompanying drawings in which like parts are designated by like reference numerals.

DETAILED DESCRIPTION

Figure 1:
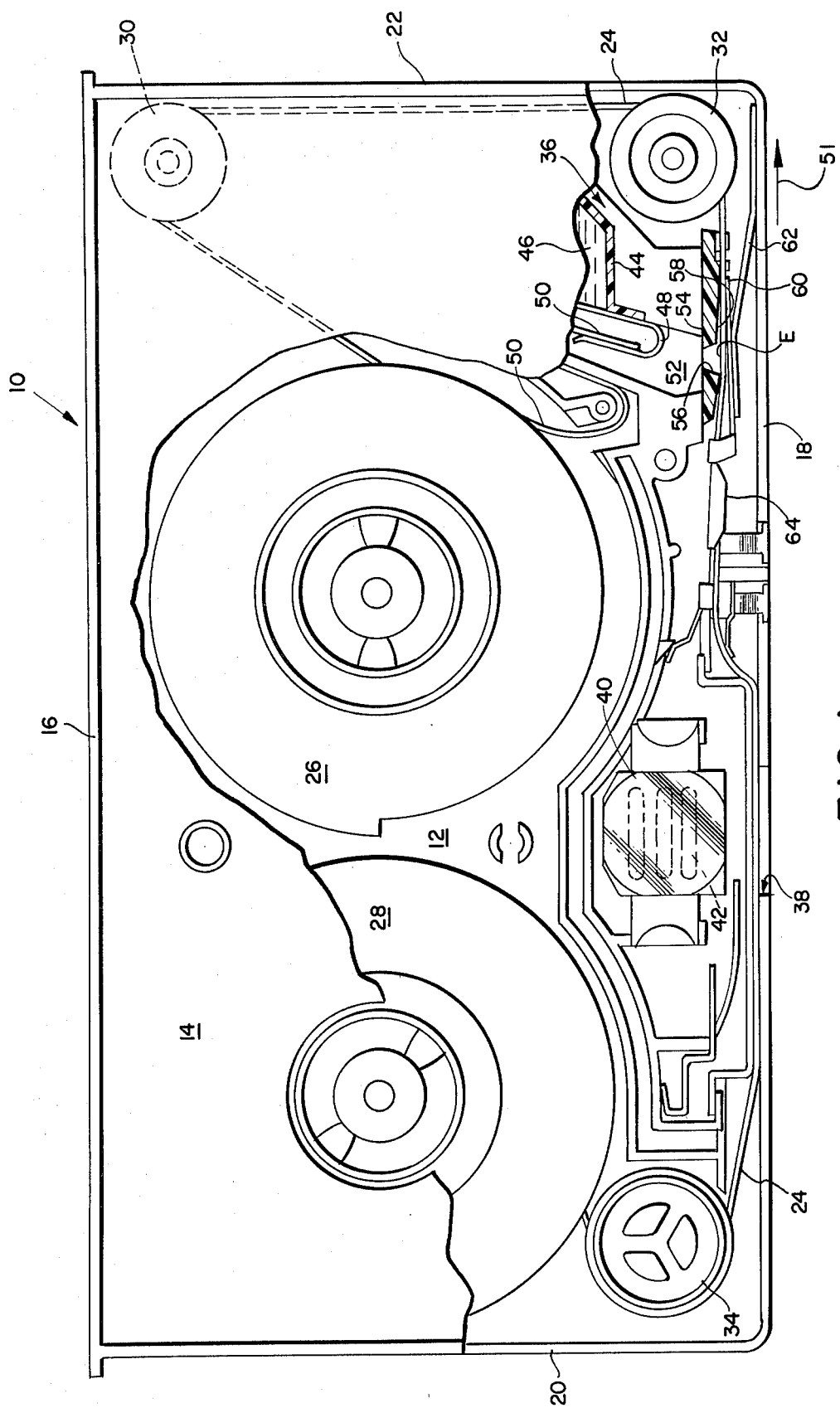
FIG. 1 is a side elevational view partly broken away and partly in section illustrating a film cassette embodying the improved film spools of the present invention.

FIG. 1 of the drawings illustrates a multipurpose film cassette incorporating the principles of the present invention and is shown to include a cassette housing 10. In this embodiment, the cassette housing 10 takes the form of a rectangular parallelepiped with a pair of exterior side walls 12 and 14 connected by top, bottom and end walls 16, 18, 20, and 22, respectively. Within the cassette housing 10, a film strip 24 is connected at opposite ends to supply and take-up spools 26 and 28. Details regarding the novel construction of these spools will be subsequently set forth.

When loaded, the film strip 24 is mounted for movement through a series of linear flights or runs defined by a bobulator roller 30, an idler or guide roller 32 and a snubber roller 34. When the film strip 24 runs between the guide roller 32 and the snubber roller 34, in passing from the supply spool 26 to the take-up spool 28, it traverses a fluid processor or applicator 36 and an exposure/projection aperture 38 formed in the bottom housing wall 18. Positioned over the exposure/projection aperture 38 is a reflecting prism 40 located adjacent ventilating openings 42 formed in the side wall 12. In passing between the rollers 32 and 34, the film strip 24 further passes the processor 36.

Referring back to the processor 36, it includes a reservoir or pod 44 of processing fluid 46 initially sealed by a tear strip 48. The tear strip 48 is connected to a film strip engaging pull strip 50 and is movable therewith. It is pointed out that the construction and operation of the tear strip 48 and the pull strip 50 are more adequately described in U.S. Pat. No. 3,895,862, issued July 22, 1975, to Joseph A. Stella, et al., which patent is commonly assigned with the present application. Therefore, the tear strip 48 and the pull strip 50 need not be further described in detail except to note that upon initiation of a processing cycle, the pull strip becomes engaged by an aperture (not shown) in the end portion of the film strip 24 as the latter moves in the required direction indicated by arrow 51. During displacement of the pull strip 50, the tear strip 48 is peeled away from the pod or reservoir 44. As a result, the processing fluid 46 flows into a chamber 50 closed at its bottom by an applicator nozzle structure 54. At the completion of the tear strip removal operation, the pull strip 50 becomes wound between the convolutions of the film strip 24 on the supply spool 26, whereas the tear strip 48 becomes separated by means (not shown).

The processing fluid 46 is released onto the upper emulsion surface E carried by and extending across the width of the film strip 24 after passing beneath nozzle opening 56. Towards the end of forming a uniform processing fluid layer (not shown) on the film strip 24, there is provided a doctoring surface 58 downstream of the nozzle opening 56. The doctoring surface 58 is formed between a pair of spaced-apart guide tracks (not shown) and has a preselected gap spacing (not shown) relative to the film strip 24 for regulating formation of the uniform layer. Also, in this regard, the film strip 24 progressively advances beneath the nozzle 44 and is supported by a pressure pad 60, which is in turn biased upwardly by a cantilevered type pressure pad spring 62 staked to and supported by the bottom wall 18. Both the pressure pad 60 and the pressure pad spring 62 essentially serve to continuously maintain successive incremental portions of the film strip 24 in engaging relation to the nozzle 54. In this manner, the film strip 24 assumes the desired relationship relative to the doctoring surface 58.

Positioned upstream of the nozzle 54 (in the context of the rewind direction 51) is a valve member 64. For advancing the valve member 64 from the position shown to a position (not shown) sealing the nozzle opening 56, at the end of the processing cycle, it is engaged by a neck-down segment (not shown) in the leading end portion of the film strip 24 during movment in the rewind direction 51.

Figure 2:
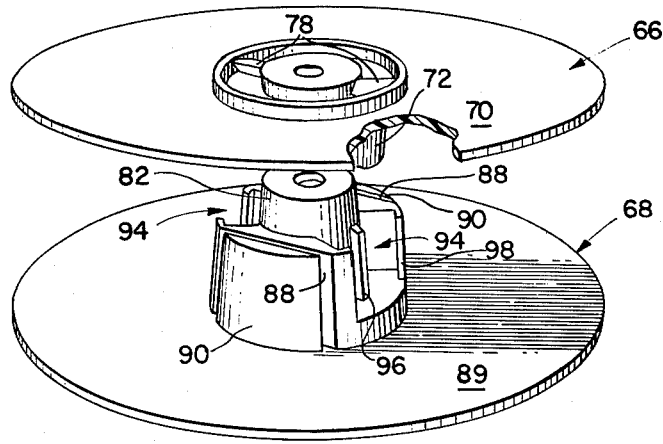
FIG. 2 is an exploded perspective view illustrating the two pieces of the separable film spool.
Figure 3:
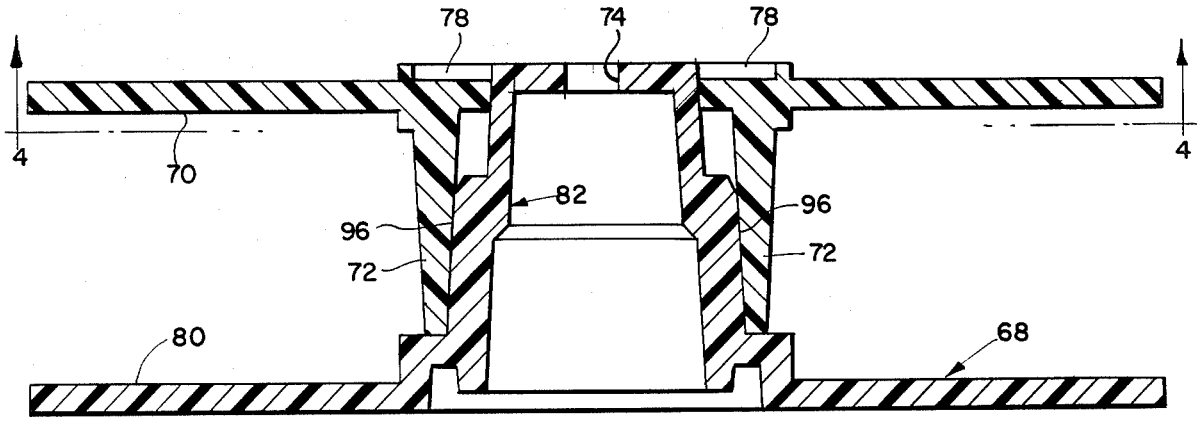
FIG. 3 is an assembled end view of the two-piece spool in an assembled condition.
Figure 4:
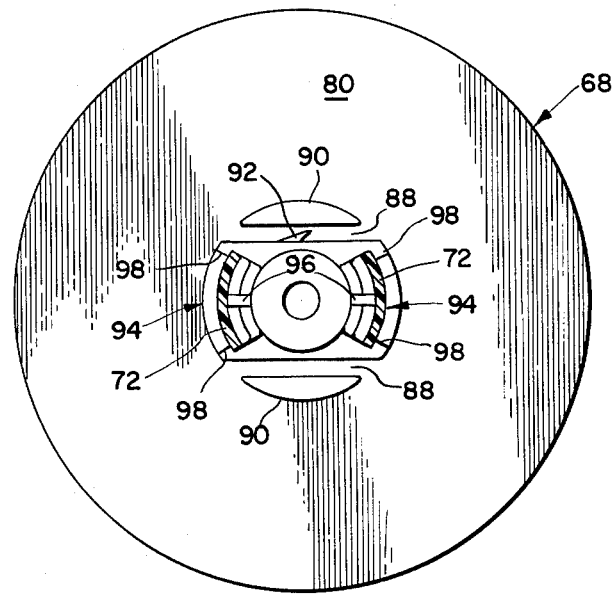
FIG. 4 is a cross-sectional view taken along the section line 4—4 appearing in FIG. 3.

FIGS. 2–4 best depict the improved separable photographic film spool of this invention. For purposes of convenience, the structure of the supply spool 26 will be described. It being understood, however, that the novel aspects of this invention likewise apply to the take-up spool 28. As depicted, the separable supply spool 26 includes a first spool member 66 and interconnected therewith a complementary and coacting second spool member 68. The first spool member 66 includes a flat circular flange 70. A pair of circumferentially spaced and axially elongated arcuate tongues 72 protrude from the flange center about opening 74 and inwardly of circular film supporting ridge 76. In this embodiment, the spool member 66 may be formed of suitable thermoplastic or thermosetting plastic material, which is relatively stiff, but capable of being flexed when subjected to sufficient flexing forces. For purposes of illustration and not limitation, the spool members 66 and 68 as well as the tongues 72 can be made from a suitable ABS thermoplastic polymer having among other physical properties medium to high impact strength. Use of this material provides for tongues which are relatively stiff yet sufficiently flexible to appropriate flexing forces. Also, the tongues 72 may have a cross-sectional thickness which is about 0.060 inch at the base thereof and about 0.040 inch at the distal end, as well as has a length of about 0.300 inch. Formed on the other side of the flange 70 are a pair of bow-tie drive connectors 78. The drive connectors enable a film spool rotating mechanism associated with the player (not shown) to drive the spool 26.

Now referring to the second spool member 68, it includes a flat circular flange 80 of similar diameter as the flange 70. Protruding from the flange 80 is a hollow hub section 82 sized and shaped for defining the rotational axis of the spool as well as for rotatable mounting on a cassette spindle (not shown). A portion of the hub 82 extends through a central opening of the flange 80 which is coaxial with the opening 74. When the first and second spool members 66 and 68 are assembled, the hub section 82 has wrapped thereon the film strip convolutions; see FIG. 5. Since the spool members 66 and 68 are separable, the flanges 70 and 80 can be molded with no draft. This is advantageous because the spacing between the flanges 70, 80 can be controlled to be substantially uniform. Thus, the tendency of the film strip convolutions, to walk or drift relative to other convolutions is reduced significantly.

With continued reference to FIG. 4, the hub section 82 is seen to include a pair of diametrically opposed film chordal slots 88 defined by spaced exterior walls 90 and an obliquely shaped barb 92. For securing the film strip 24 to the supply spool 26, the former is provided with an aperture (not shown) in the leader segment thereof which is hooked on the barb 90 while the chordal slot 88 receives a part of the leader.

As best shown in FIGS. 2-4, opposed recesses 94 are formed for cooperating with the spaced pair of arcuate tongues 72. A tongue deflecting rib 96 is provided centrally in each circumferential recess 94. Opposite ends of the recesses 94 are formed with retaining ridges 98. The recesses 94 provide means for slidably receiving the tongues 72.

During assembly of the tongues 72 into the corresponding recesses 94, the deflecting ribs 96 will engage the inner periphery of the tongues while retaining ridges 98 engage the outer periphery thereof. Continued forcing together of the spool members 66 and 68 results in the rib 96 deflecting the tongue 72 from an initial non-deformed condition into a releasable and tighter frictional engagement with the retaining ridges 98. Also, the present invention contemplates that the radius of curvature of the arcuate tongues 72 be mismatched relative to the radius of curvature of the hub section 82 so the radius of curvature of the tongues 72 will decrease and cause a relative bowing thereof. Thus, the recesses 94 along with the ribs 96 and retaining ridges 98 define means for flexing the tongue 72 into tight and releasable frictional engagement therewith. Such cooperation advantageously offsets tolerance variations of the tongues 72 and recesses 94 which might otherwise cause a relatively loose fit therebetween. A loose fit is objectionable due to, among other things, the possibility of the spool members 66 and 68 not remaining in their intended positions.

The operation of the improved spool is believed apparent from the previous description.

Figure 6:
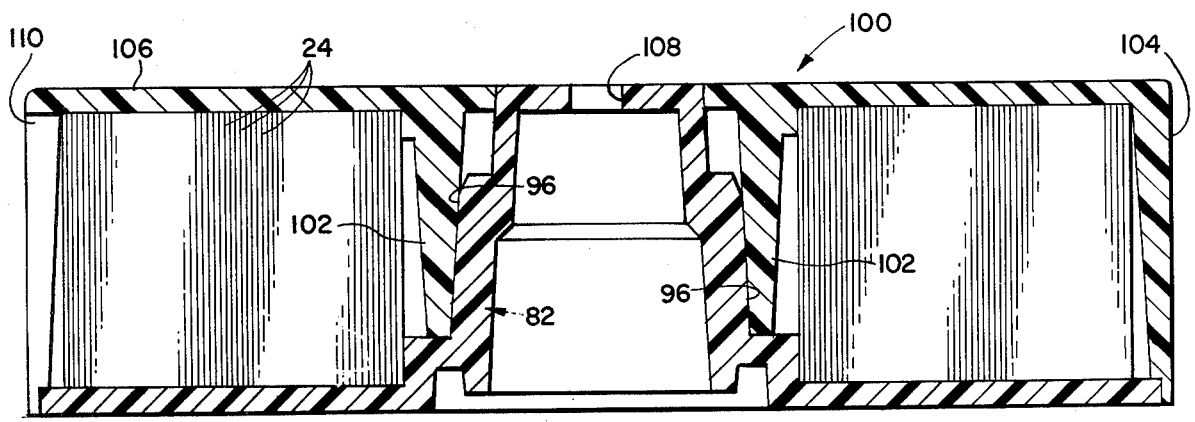
FIG. 6 illustrates a cover member connected to the one spool member having film wrapped thereon.
Figure 7:
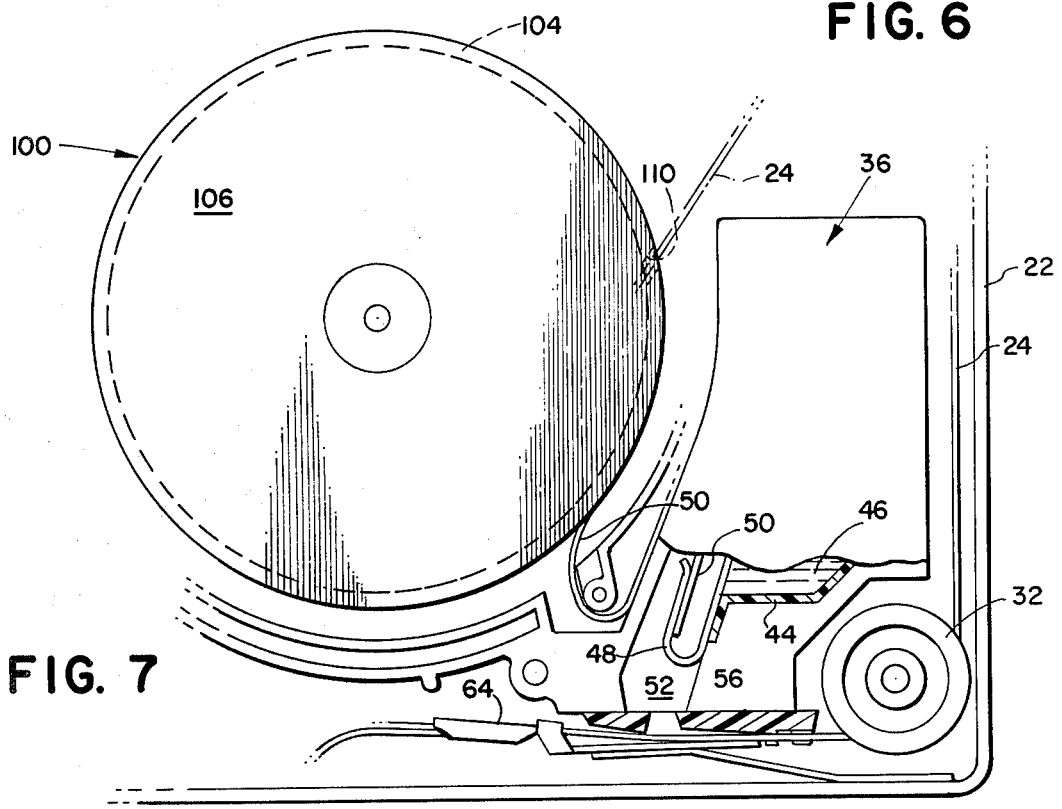
FIG. 7 illustrates the mounting of the covered film spool arrangement of FIG. 6 in the film cassette shown in FIG. 1.

The present invention also contemplates an improved method of manually loading the unexposed film strip 24 into the cassette housing 10. Towards this end, the film spool is separable and includes a removable cover member 100 best shown in FIGS. 6 and 7. The removable cover member 100 includes a pair of protruding tongue members 102, similar to tongue members 72, and are constructed to slidably engage within the recesses 94. A rim 104 extends circumferentially from a flat circular flange 106 having central opening 108 which allows the cover 100 to accommodate the hub 82. In the practice of this invention, the rim 104 is sized and shaped to enclose the wrappings of the film strip 24, such as depicted in FIG. 6 and has an outer periphery slightly exceeding that of the flange 70. Moreover, the rim 104 serves as a light shield for the unexposed film. It will be pointed out that the tongues 102 are preferably constructed to have a loose fit within the recesses 94. This is for facilitating quick release and attachment of the removable cover member 100 during loading. A slot 110 is formed in the rim 104 for allowing free passage of the film strip 24 therethrough for threading purposes.

Figure 5:
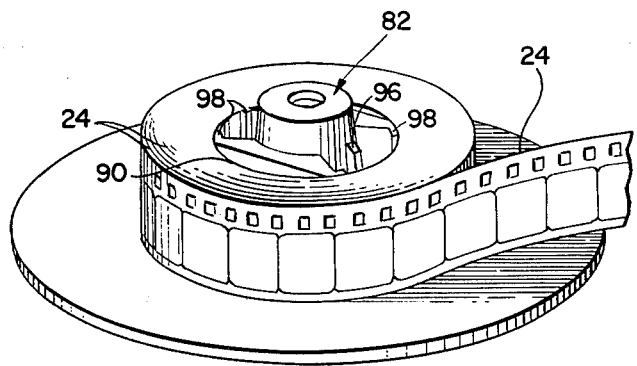
FIG. 5 illustrates the film wrapped about one of the spool members.

According to this process, the unexposed film strip 24 is wound on the first spool member 66, such as shown in FIG. 5. This approach differs from the conventional approach in that only one-half of a film spool is utilized for mounting the film. Of course, the winding process is performed by a known loading machine in the dark. After winding the removable cover 100 is attached to the first spool member 66 by having the tongues 102 slidably cooperate with the recesses 94. This approach obviates use of the present light-tight container which is dimensioned to removably receive therein the entire film wound spool for transport to the cassette. It should be pointed out that this container is more expensive in relation to the removable cover 100 and cannot be mounted in the cassette. Since the removable cover 100 has about the same diameter as the spool member 66, both can be mounted on the cassette spindle (not shown) as a conventional one-piece spool. In this regard, see FIG. 7. Accordingly, the wrapped film 24 can be mounted in the cassette house 10 without having to be taken out of the conventional light-tight container. Moreover, whenever the wound one-piece spool is removed from the light-tight container for threading purposes, the removal operation is required to be done in complete darkness. Otherwise, handling of the film outside the cassette would likely cause the inner wraps of the film convolutions to become fogged. This complete darkness requirement of the prior approach is obviated because of applicants invention. In this connection, the film strip 24 can be threaded in the cassette housing 10 by having the film strip pass through the slot 110. Thereafter, the removable cover 100 can be manually lifted from the spool member 66 and the spool member 68 can be connected thereto in the manner described. This replacement procedure can be accomplished in subdued light since the handling of the film spool outside the cassette is eliminated. Thus, there is less likelihood for the inner wraps or convolutions of the film to be fogged by incidental light as might be the case if the film had to be handled outside the cassette. Accordingly, a less expensive and quicker loading operation is achieved.

Thus, it will be appreciated that as a result of this invention, an improved photographic film spool for use in multipurpose film cassettes is provided by which the above-mentioned objectives are completely fulfilled. There is provided, moreover, an improved manual loading procedure which fulfills completely the above objectives. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by references to the appended claims.

What is claimed is:

1. A two-piece spool for winding of a flexible strip, said spool having a pair of interconnected members, each of said members having a flange portion, at least one of said members carrying a hub section defining the rotational axis of the assembled spool and configured for supporting said strip in a convolutely wound condition, a first of said members having at least one deflectable tongue extending from the flange of said first member in a generally parallel relation to said axis and being constructed and dimensioned to be deflected in a direction generally transverse to its longitudinal axis to facilitate releasable frictional engagement thereof, and a second of said members having means for slidably receiving and deflecting said tongue so as to interconnect said members, said receiving means including means responsive to sliding engagement with said tongue for deflecting said tongue along an axis generally transverse to its longitudinal axis into a flexed and deflected condition from an initial undeflected condition to a deformed and deflected condition so that when deflected a tight and releasable frictional engagement results with said receiving means to retain said members in their interconnected arrangement.

2. The spool of claim 1 wherein said hub section defines a given diameter for winding of said strip, and said tongue and said receiving means are located on their respective members within said diameter such that said strip may be wound on said one member prior to spool assembly and said other member subsequently united to said one member without substantially interfering with the strip winding.

3. In a separable two-piece film spool adapted to be rotatably mounted on a film cassette support and upon which a photographic film strip may be wound, the improvement wherein said spool comprises:
a first member including a flange portion and having a hub section extending away from the flange portion, said hub section dimensioned and configured for having the film strip convolutely wrapped thereabout and for having the hub section rotatably mounted on the cassette support, said hub section having at least a tongue flexing and deflecting member and being spaced circumferentially intermediate a pair of circumferentially spaced tongue retaining members; and
a second member having a flange portion spaced from said first member flange portion which accommodates the film strip, and at least one deflectable tongue member extending longitudinally outwardly from the flange portion of the second member in a generally parallel relation to an axis of said hub and being made of a deflectable flexible material which is deflectable in a direction generally transverse to its longitudinal axis to facilitate releasable frictional engagement thereof, said deflectable tongue member being dimensioned and configured to be flexibly deflected by said tongue deflecting member so that a tight but releasable frictional engagement axis therebetween and at least longitudinal marginal portions of said tongue member are in tight but releasable frictional engagement with said tongue retaining members, thereby offsetting tolerance variations of said tongue member and said tongue deflecting and retaining members which might otherwise cause a loose fit therebetween.

4. The film spool of claim 3 wherein said tongue member is generally arcuate in cross-section and having a radius of curvature different than the radius of the curvature of the hub portion for enhancing the frictional interference fit therebetween.

5. In a film cassette containing a two-piece film spool rotatably mounted on a support in said cassette and upon which a photographic film strip may be wound, the improvement wherein said spool comprises:
a pair of interconnected members, each of said members having a flange portion, at least one of said members carrying a hub section defining the rotational axis of the assembled spool and configured for supporting said strip in a convolutely wound condition, a first of said members having at least one deflectable tongue extending from the flange of said first member in a generally parallel relation to said axis and being constructed and dimensioned to be deflected in a direction generally transverse to its longitudinal axis to facilitate releasable frictional engagement thereof, and a second of said members having means for slidably receiving said tongue so as to interconnect said members, said receiving means including means responsive to sliding engagement with said tongue for deflecting said tongue along an axis generally transverse the longitudinal axis of said tongue into a flexed and deflected condition from an initial undeflected condition to a deformed and deflected condition that when deflected a tight and releasable frictional engagement results with said receiving means to retain said members in their interconnected arrangement.

6. The cassette of claim 5 wherein said hub section defines a given diameter for winding of said strip, and said tongue and said receiving means are located on their respective members within said diameter such that said strip may be wound on said one member prior to spool assembly and said other member subsequently united to said one member without substantially interfering with the strip winding.

7. The cassette spool of claim 5 wherein said tongue is generally arcuate in cross-section and having a radius of curvature different than the radius of the curvature of the hub section for enhancing the frictional interference fit therebetween.

8. The cassette of claim 5 wherein said deflecting member engages an inner periphery of said arcuate tongue member and said retaining members engage the outer periphery of said arcuate tongue member.

9. A two-piece spool for winding of a flexible strip, said spool having a pair of interconnected members, each of said members having a flange portion, at least one of said members carrying a hub section defining the rotational axis of the assembled spool and configured for supporting said strip in a convolutely wound condition, said hub section defining a given diameter for winding of said strip, each of said members having retaining means extending from the flange of their respective member for cooperating with each other to retain said members in an assembled condition with said flanges spaced for accommodating the width of said strip, said retaining means being located on their respective members within said hub diameter such that said strip may be wound on said one member prior to spool assembly and said other member subsequently united to said one member without substantially interfering with the strip winding.

10. In a separable two-piece film spool adapted to be rotatably mounted on a film cassette support and upon which a photographic film strip may be wound, the improvement wherein said spool comprises:

a first member including a flange portion and having a hub section extending away from the flange portion, said hub section dimensioned and configured for having the film strip convolutely wrapped thereabout and for having the hub section rotatably mounted on the cassette support, said hub section having at least a tongue flexing member and being spaced circumferentially intermediate a pair of circumferentially spaced tongue retaining members; and a second member having a flange portion spaced from said first member flange portion which accommodates the film strip, and at least one tongue member extending longitudinally outwardly from the flange portion of the second member and being made of a flexible material, said tongue member being dimensioned and configured to be flexed by said tongue deflecting member so that a tight but releasable frictional engagement exists therebetween and at least longitudinal marginal portions of said tongue member are in tight but releasable frictional engagement with said tongue retaining members, thereby offsetting tolerance variations of said tongue members and said tongue deflecting and retaining members which might otherwise cause a loose fit therebetween, said deflecting member engages an inner periphery of said arcuate tongue member and said retaining members engage the outer periphery of said arcuate tongue member.

11. In a separable two-piece film spool adapted to be rotatably mounted on a film cassette support and upon which a photographic film strip may be wound, the improvement wherein said spool comprises:

a first member including a flange portion and having a hub section extending away from the flange portion, said hub section dimensioned and configured for having the film strip convolutely wrapped thereabout and for having the hub section rotatably mounted on the cassette support, said hub section having at least a tongue flexing member and being spaced circumferentially intermediate a pair of circumferentially spaced tongue retaining members; and a second member having a flange portion spaced from said first member flange portion which accommodates the film strip, and at least one tongue member extending longitudinally outwardly from the flange portion of the second member and being made of a flexible material, said tongue member being dimensioned and configured to be flexed by said tongue deflecting member so that a tight but releasable frictional engagement exists therebetween and at least longitudinal marginal portions of said tongue member are in tight but releasable frictional engagement with said tongue retaining members, thereby offsetting tolerance variations of said tongue member and said tongue deflecting and retaining members which might otherwise cause a loose fit therebetween, said second member has a rim extending from and about the periphery of the flange and being dimensioned and constructed to substantially encapsulate the film between said flanges and said rim and having a slot therethrough allowing passage of the film strip.

* * * * *